United States Patent Office 3,317,355
Patented May 2, 1967

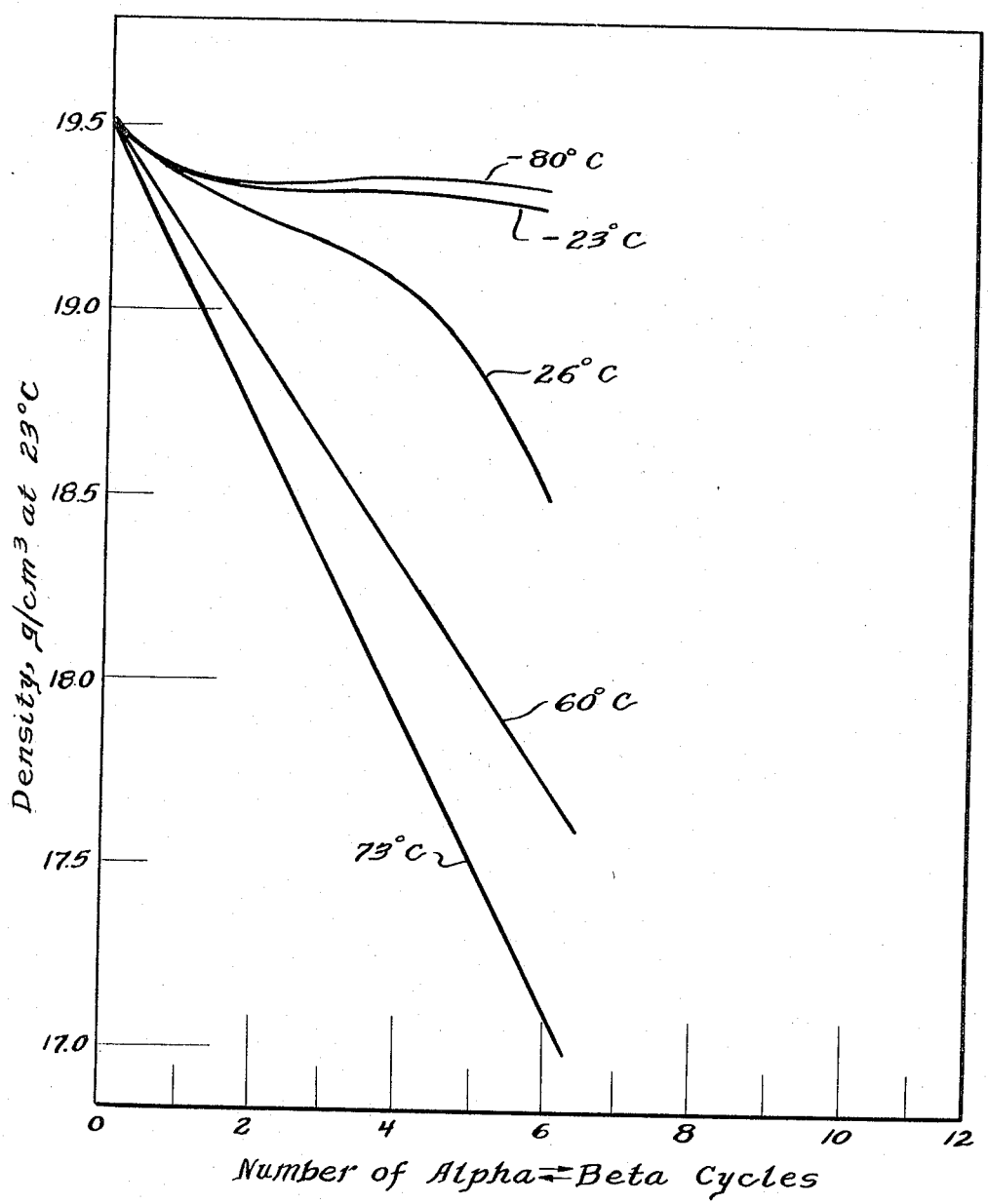

3,317,355
HEAT TREATMENT OF PLUTONIUM
Ronald D. Nelson, Grandview, Wash., assignor to the United States of America as represented by the United States Atomic Energy Commission
Filed Feb. 12, 1965, Ser. No. 432,435
3 Claims. (Cl. 148—3)

This invention relates to a method of treating plutonium metal for the purpose of improving its physical characteristics.

Plutonium is primarily used as fuel in nuclear reactors.

Plutonium metal has a tendency to crack, in particular when it is cooled, after casting, from beta-phase temperatures to alpha temperatures. Alpha-phase structure occurs below about 120° C., while beta temperatures extend from there upwardly to about 205° C. The melting point of plutonium is at about 640° C., and between it and beta-phase temperature the plutonium, in cooling, consecutively assumes $\epsilon$, $\delta'$, $\delta$ and $\gamma$ structures.

Formation of cracks impairs the density of plutonium to a great degree, and also other physical characteristics such as mechanical strength, fabricability and thermal conductivity. These effects are even more pronounced in plutonium metal used in a reactor where it is subjected to more or less radical temperature fluctuations. Under reactor conditions plutonium crystals grow in all directions, which causes distortion of the fuel elements. Such dimensional instability is a most hazardous phenomenon which can lead to jamming of the fuel elements and thus to uncontrollably fast chain reactions in some locations.

The addition of small quantities of other metals has been considered in order to eliminate the above-listed drawbacks and to improve the ductility and other characteristics of plutonium. However, plutonium diluted or "contaminated" by otherwise suitable additives is most undesirable for use in nuclear reactors.

It is an object of this invention to provide a process for the casting of plutonium metal in which cracks do not develop during or after cooling.

It is thus also an object of this invention to provide a process for the casting of plutonium metal by which a plutonium metal of great density is obtained.

It is finally also an object of this invention to provide a process for the casting of plutonium metal that can be fabricated, for instance that can be alpha-rolled and can be annealed at elevated temperatures.

It has been found that a plutonium of improved physical and mechanical characteristics is obtained if, upon casting, it is not cooled completely to room temperature by the "natural" procedure, but is allowed to cool only to just below the equilibrium transformation point of beta plutonium to alpha plutonium in the natural way, whereby beta-phase structure is predominantly retained, and if it is then rapidly cooled, e.g. by quenching, to a radically lower alpha temperature and held in said lower alpha region for several minutes. A further improvement can be brought about by thermally cycling the plutonium metal subsequent to quenching between said lower alpha temperatures and alpha temperatures close to the $\alpha \rightarrow \beta$ transformation point, which more specifically is between about −75 to −115 and +100° C.; in this step any residual or retained beta crystals are converted to the alpha phase.

The process of this invention thus comprises melting metallic plutonium at about 650° C., casting the liquid plutonium into the shape desired, allowing the plutonium shape to cool to a temperature within the range of from 110 to 95° C., immersing the plutonium shape in a liquid bath having a temperature of between −75 and −115° C., and holding said shape at this temperature for several minutes. The invention also comprises the optional step of cycling the quenched plutonium upon removal from the bath between −80 and +100° C.

Melting and casting of the plutonium can be carried out by any means known to those skilled in the art; a vacuum is advantageous because of the high reactivity of pure plutonium. Cooling to just below $\beta \rightarrow \alpha$ equilibrium transformation temperature is then best carried out by simply allowing the metal body obtained to cool in a "natural" way. Slow cooling to just below the $\beta \rightarrow \alpha$ transformation temperature does not bring about change to alpha structure. Thereafter the quenching step, which is the critical step of the process of this invention, is performed by immersing the plutonium in a liquid that has a temperature of between −75 and −115° C. In this step change to alpha structure occurs. Any liquid that does not react with plutonium can be used for this purpose; however, alcohols, in particular ethyl alcohol, and fluorinated aliphatic compounds have been preferred.

As already indicated, the temperature range of this cooling step is critical. For instance, it has been established that, if the plutonium body is slowly cooled to alpha temperature within the higher range only, about +70° C., the plutonium body will show physical damage and consequently will have a low density, while with the temperature range of this invention a sound metal of high density and dimensional stability is obtained. These characteristics are not impaired by thermal cycling. Likewise, quenching from gamma temperatures to alpha temperatures is not satisfactory, because then the density of the plutonium body decreases when thermally cycled between phases.

The plutonium article should be held in the quenching liquid for at least 10 minutes; a holding period of between 10 and 15 minutes sufficed in all cases. Most of the crystals are transformed thereby from the beta-phase structure to alpha-phase crystals of a very fine grain structure. Any nonconverted beta crystals, however, can then be transformed into alpha structure by subsequent thermal cycling between −80 and 100° C. This optional, but advantageous, after-treatment is preferably carried out immediately upon removal of the plutonium metal from the quenching bath; it is preferably repeated several times. This thermal cycling within the alpha-phase temperature does not cause the formation of any cracks or similar flaws in a plutonium piece that was used in crack-free condition.

Density measurements and metallographic observations were made in all instances and interpreted as an indication of the presence or absence of flaws, such as cracks, and also of other physical properties, for instance of thermal conductivity and mechanical strength. Such conclusions were justified, because a dense and sound piece of plutonium always had the better physical and metallurgical characteristics.

*Example 1*

Five specimens of plutonium metal that had been cast from the same melt into rods, each 1 cm. long and 1 cm.

in diameter, were heated to 180° C., held there for about 30 minutes whereby beta crystal structure was assumed and allowed to cool to 100° C. Each sample was then quenched by immersion in alcohol for 12 minutes. The temperature of the alcohol differed in each sample; it was −80°, −23°, +26°, +60° and +73° C., respectively. The density of each sample was measured after quenching and after it had assumed room temperature. Each sample was then subjected to thermal cycling between 180° C. and the respective temperature of the alcohol bath given above. Again, the density of each sample was measured after each cycle at room temperature; six cycles were applied to each sample.

In the accompanying drawing the results of these five series of experiments are summarized in the form of curves showing the relation between density and number of thermal cycles applied. It is obvious that the treatment at 26, 60 and 73° C. did not result in a plutonium metal of high dimensional stability, since the density of these three metals decreased rapidly with increasing number of thermal cycles; they also had cracked more or less. In contradistinction thereto, the two samples that had been quenched to −80 and −23° C. had the highest density and practically retained this high density during all six cycles of thermal treatment. This clearly indicates the criticality of the temperature for quenching.

*Example II*

Two castings were made from the same sample of plutonium. Casting A was allowed to cool normally to room temperature. Casting B was allowed to cool normally to about 105° C. It was then quenched in alcohol at a temperature of −110° C. for about 12 minutes, then thermally cycled five times by alternately being held in alcohol at −80° C. and in a fluorocarbon at 100° C. for periods of about 10 minutes.

Casting A had a density of 19.55 g./cm.³ and contained numerous microcracks. Casting B had a density of 19.70 g./cm.³ and contained no microcracks visible at a magnification of 100 diameters.

*Example III*

Again, two castings were made of identical plutonium metal. Casting A was allowed to cool normally to room temperature. Casting B was allowed to cool normally to about +110° C., then quenched in alcohol at a temperature of about −110° C.

Each casting was then thermally cycled 17 times between +180° C. (beta phase) and −80° C. (alpha phase), then from −80° C. to +100° C. (within the alpha phase) five times. The results are shown in the table below.

|  | Casting A, g./cm.³ | Casting B, g./cm.³ |
|---|---|---|
| Density before Cycling | 19.60 | 19.72 |
| Density after 17 Alpha ⇌ Beta Cycles | 18.98 | 19.68 |
| Density after Five Subsequent Cycles within the Alpha Phase | 19.04 | 19.72 |

It will be noted that the casting treated in accordance with my invention was extremely stable under the alpha-beta cycling. It will also be noted that cycling within the alpha phase produced a slight increase in density in both castings.

It will be understood that the invention is not to be limited to the details given herein but that it may be modified within the scope of the appended claims.

The embodiments of the invention in which an exclusive property or privilege is claimed are defined as follows:

1. A process of treating plutonium metal, comprising heating the plutonium to above 650° C. whereby it melts, casting the molten plutonium into the shape desired, allowing the plutonium shape to cool to between 110 and 95° C., immersing the plutonium shape in a liquid quenching bath having a temperature of between −75° C. and −115° C., and holding the plutonium shape at this temperature for between 10 and 15 minutes.

2. The process of claim 1 wherein the quenching bath is ethyl alcohol.

3. The process of claim 1 wherein the plutonium shape, promptly after quenching, is thermally cycled between −80 and 100° C. one or more times.

References Cited by the Examiner

AEC Report HW–55778, Transformation Kinetics of Plutonium, Part I, R. D. Nelson, April 17, 1958.

AEC Report HW–56843, Transformation Kinetics of Plutonium, Part II, R. D. Nelson, July 18, 1958.

AEC Report HW–61681, Thermal Cycling of Plutonium, Part I, R. D. Nelson, September 16, 1959.

AEC Report HW–67737, Observations on the Microstructure of Plutonium, R. D. Nelson, March 1961.

DAVID L. RECK, *Primary Examiner.*

CHARLES N. LOVELL, *Assistant Examiner.*